(No Model.)
O. C. WOOLSON.
CAR BRAKE.
No. 263,083. Patented Aug. 22, 1882.
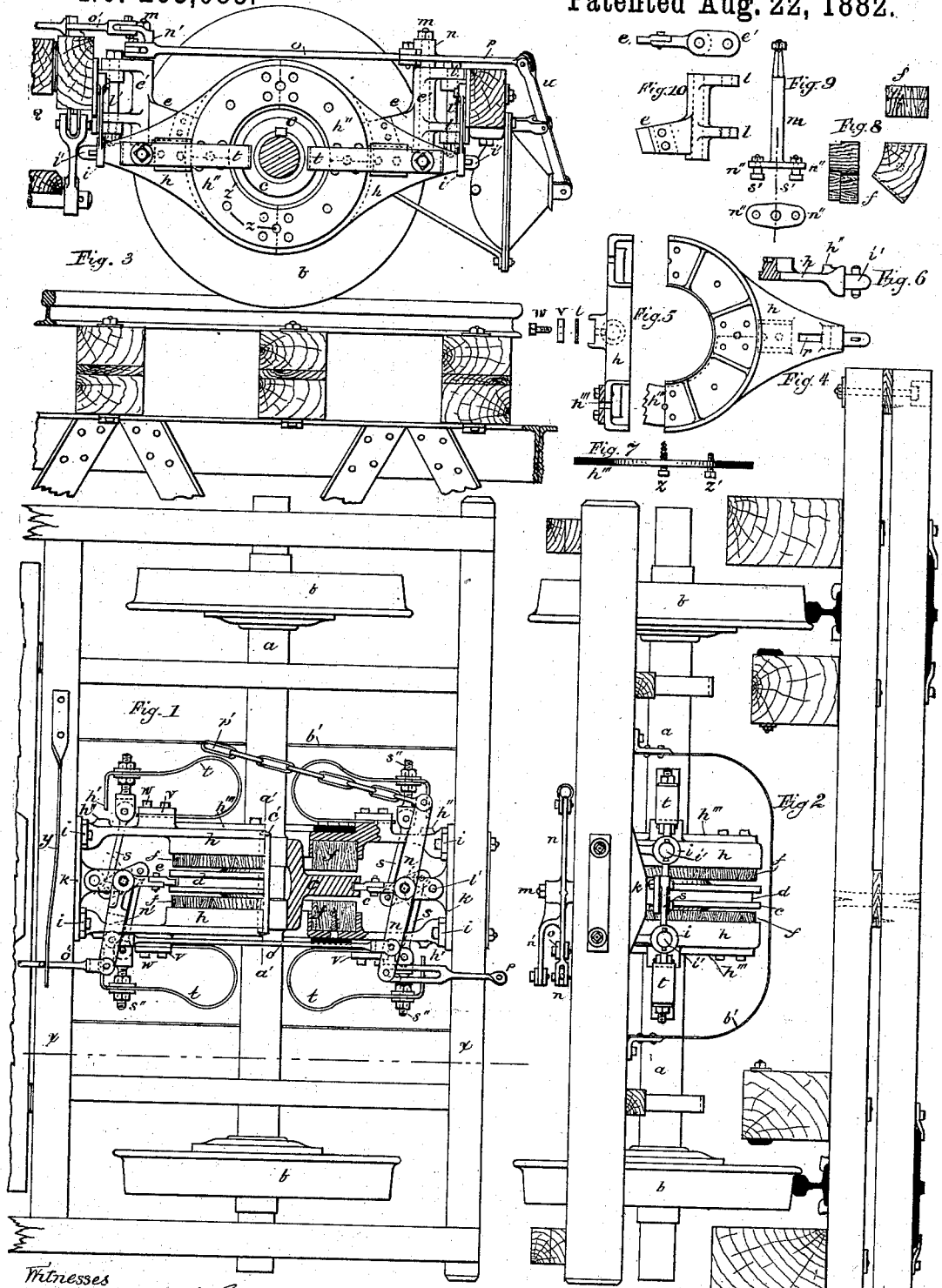
Witnesses
Wm. M. Hoes.
Edmund D. Hennessy
Inventor
Orosco C. Woolson
by Rollin M. Morgan
attorney

UNITED STATES PATENT OFFICE.

OROSCO C. WOOLSON, OF NEWARK, NEW JERSEY.

CAR-BRAKE.

SPECIFICATION forming part of Letters Patent No. 263,083, dated August 22, 1882.

Application filed June 10, 1882. (No model.)

*To all whom it may concern:*

Be it known that I, OROSCO C. WOOLSON, of the city of Newark, in the county of Essex and State of New Jersey, have invented a new and useful Improvement in Car-Brakes; and I hereby declare that the following is a full, clear, and exact description thereof, reference being had to the accompanying drawings, forming a part of this specification, in which—

Figure 1 represents a plan, and also a half-section, of the brake apparatus. Fig. 2 is an end elevation of the truck; Fig. 3, a longitudinal section on the line $x\ x$, Fig. 1. Fig. 4 is an inside view of one-half of one of the side plates. Fig. 5 is a center end view of one of the side plates, H H. Fig. 6 is a plan of the trunnion of one of the side plates, H H. Fig. 7 is a semicircular clamping-strap, which secures, by bolts Z', the two halves of one of the side plates, H H, together when in position around the axle. Fig. 8 is a detached friction-block rabbeted on two sides of one face to fit over the radial webs in side frames, H H. Fig. 9 is a side elevation and end view of a detached double crank and wrist-pin. Fig. 10 is a detached vibrating fulcrum-bracket, which carries the double crank, Fig. 9.

My invention relates to that class of brakes in use on railway and street car trucks in which a clamp or shoe is forced in contact with a moving part through the intervention of a system of levers that may be operated by the air and vacuum appliances in use and other powers.

The arrangement heretofore adopted for brake purposes is to apply a clamp or shoe to the tread of the wheel.

The object of my invention is to obtain a greater frictional contact-surface than is possible by applying an iron shoe to the tread of the wheel, and to secure thereby with a less amount of applied power a greater resisting force.

My invention is particularly applicable to trains making rapid transit and frequent and sudden stops; and it consists in arranging one or more fixed disks upon the axle between the wheels with one or more frictional surfaces to co-operate with corresponding movable clamps or shoes brought in contact with said surfaces by suitable devices, as hereinafter set forth.

In the accompanying drawings I have shown an adaptation of my invention in connection with car-trucks. To enable others to understand the same, I will first proceed to describe the construction and operation of such adaptation of parts, and will subsequently define in the claims the novel characteristics thereof.

A represents the axle, and B the wheels.

C is a disk having the whole of its frictional contact-faces at an angle of ninety degrees to the center of the axle. This is absolutely necessary, otherwise in the movements of the axle vertically when passing over switches, frogs, crossings, &c., if the disk could not accommodate itself to this vertical and diagonal movement it would bring great strain upon the mechanism of the brake, and thus destroy it. I therefore have the friction-faces parallel to each other and at angles of exactly ninety degrees to the center of the axle and arranged upon the axle about midway between the wheels and rigidly secured thereto by shrinking or other known means.

The axle A is provided with an enlargement of the body of the axle for the reception of the disk C, so that it may be readily applied, and to facilitate the introduction of an intermediate wedge or feather, C', when such means are employed to secure the disk C in its place.

This construction of the axle is more particularly designed in applying my invention in the original construction of the trucks. A modification in the construction of the hub of the disk when designed to be applied to trucks already in use would be necessary, as it would have to be made in halves and secured to axle A by well-known means.

The disk C is circular in shape, with vertical parallel sides, forming the contact-surfaces, void of all shoulders, and may be composed wholly or in part of iron or other material. When of iron its contact vertical faces are to be of greater area than the cheek-pieces or shoes F F, which are brought in contact with it, thereby avoiding forming a shoulder on the softest substance composing the contact portions. The periphery of this disk may be provided with a circumferential groove, D, (shown in Fig. 2,) to engage with the end of a projecting pivoted or yielding arm, E, connected to the vibrating fulcrum-bracket E', so that in a lateral movement of the axle and disk the entire brake mechanism is correspondingly moved and the same relative position of the parts maintained.

F F represent the clamps or shoes, constructed of corresponding circular shape and having faces of less frictional-bearing area than the disk C. These clamps or shoes F F and the disk C are made of necessary thickness to insure sufficient strength and wearing capacity, the clamps or shoes F F being preferably composed of wood. In this case the iron-faced disk C would be of greater frictional area than the wooden side cheek-pieces, F F. A frame-work composed of side plates, H H, is suspended by a trunnion at each end from and within the truck-frame by pivoted links I I, the halves of the side plates heretofore referred to being securely fastened in their places around the axle by semi-annular plates H'''. These trunnions I' I' permit a necessary slight or partial rotary movement of the side plates, H H, at right angles with the rotation of the axle to accommodate the frictional faces of the clamps or shoes F F to any possible wabbling movement of the disk C. The links I I permit the side plates, H H, to swing from side to side and accommodate themselves to any position or location that the disk C may take laterally. This construction permits the frictional faces or the clamps or shoes F F and the disk C to remain in complete and constant frictional contact when the brake is being applied. The links I I act not only to permit the side plates, H H, to swing, as aforesaid, but also retain said side plates in position against any revolving motion which may be produced by the application on the brake, whether the axle have a forward or backward revolution, and produce no lifting or twisting effect upon the truck-frame, such as is caused by the application of the ordinary brake apparatus now in common use. The clamps or shoes F F are rigidly fixed to side plates, H H, by screws Z, face to face with the disk C. The central aperture in side plates, H H, through which the axle and the hub of the disk C pass, is enlarged to give sufficient clearance to the axle and said hub of disk C in its revolution, and also to provide for lateral and vertical movements of the aforesaid disk C. By this location and arrangement of the parts described it will be readily seen that the disk C and corresponding clamps or shoes F F may be constructed, if necessary, of a diameter equal to the car-wheels, and thereby present a very much greater area of frictional surface than is possible by the method now in use. The said clamps or shoes may be made of wood, which for many reasons is preferred, but which has heretofore been found impracticable, owing to the small bearing-area which the limited portion of the tread-surface presents and the consequent destruction of the s oes by heat and wear when subjected to the great pressure necessary in applying brakes.

I do not confine myself to the particular location of the disk C, as shown, for it may be arranged adjacent to or upon the wheels of the truck and duplicated, if desired, without departing from the principle of operation involved.

In this description of the general organization and function of the essential elements of my invention it is not deemed necessary to more minutely refer to such minor details of construction as make up the parts referred to, because the particular means shown for fixing such parts together may be secured by the use of other expedients.

The mechanisms for engaging and releasing the clamps or shoes and disk, and also permitting a vertical and lateral movement of the latter independent of said devices without disturbing their relative arrangement, consists in double-eared bracket K K, firmly secured to the truck-frame between the links I I, upon which is hung a vibrating fulcrum-bracket, E', held in position by hinge-pin L'; or the mechanism may be hung from the axle, so as to move with it laterally and vertically. Upon the ears of the bracket K rest the pivoted arm L of the bracket E', through the body of which is journaled the semi-rotary rod or wrist M. At the upper end of the rod or wrist M double crank-levers N and N' are rigidly attached. Adjacent to one end of these levers N and N' is pinned a connecting bar or rod, O, to hold them in their relative positions at either side of the disk C. To the outer end of the lever N' is pinned a rod or bar, O', which connects the mechanism on either side of the bolster-frame Q, and, if necessary, may be continued by chains and rods and transmit the motion to the brake mechanism of each truck and axle throughout the train. The connection of the double crank-lever N to the motive power may be accomplished by the chain P', which runs to the hand-brake wheel and the slotted link P, which connects with the air or vacuum brake appliances in the usual way. The object of this slot in link P is to permit the lever N to be operated by the chain P' without moving the lever U in Fig. 3. The double cranks N'', Fig. 9, formed upon the lower end of the rod or wrist-pin M, are positioned at the proper angle relative to the other parts, Fig. 1, so that a lateral movement is communicated to the eye-rods S S by the movement of the double lever N. Eye-rods S S are pivoted at one end to the double crank N'' by the pins S', and at the other end pass loosely through the slot R in the side plates, H H, and connect with spade-handle adjustable screws S'', which are secured to side spring, T, the other end of the side spring, T, being securely fixed to the side plates, H H, by the clamp-plate V and screws W. The result of this combination is to enable a corresponding lateral movement to be given to the side plates, H H, flexible in its nature by reason of the yielding of these springs. The object of this yielding connection or flexibility of the operative mechanism with the side plates, H H, is to prevent a sudden and extreme pressure upon the friction-brake surfaces of the clamps or shoes F F when first brought in contact, the accomplishment of which is desirable in all types of brakes. This flexibility is limited, however, in its action by the contact of the lip H' with the projecting lug H'', formed upon the outer face and near the trunnion of the side plates, H H. When this contact takes place the yielding of the spring T ceases and the connection between the frictional faces of the brake and the operating mechanism is direct and rigid.

The clamps or shoes F F and the frictional bearing-disk C are brought in uniform contact on either side of the axle by a longitudinal movement imparted to the rod O from the source of power and communicated through the intermediate connecting mechanism hereinbefore described, the disengagement being effected by the tension of the spring Y, the free end of which engages with the rod O', as shown in Fig. 1.

By the connection, as hereinbefore described, being made between the operative parts and the fixed disk C (shown in Fig. 1) the same relative position of all the parts is constantly maintained, notwithstanding the lateral and irregular movement of the wheels and axle upon the truck-frame which the vibration of the car and unevenness of the roadway produces.

The combined mechanism for operating the brake is entirely incased in the truck-frame within the housing b', preventing dust, &c., from getting into the working parts, and gives to the truck a much neater and taut appearance.

My invention prevents all wear and tear of brakes on the tread of the wheels, reduces the cost of maintenance of brake-shoes to a minimum, reduces the steam or vacuum force by reason of the increased braking area, overcomes all wear on the rails caused by the fine cuttings from the tread of the wheel and the brake-shoe now used, does away with the noise of escaping steam and friction between the tread of the wheels and brake-shoe, and overcomes all fore-and-aft thrust on the journal-boxes.

Since perfecting my invention I have become aware that a patent, No. 48,810, was issued to C. H. Gustin on July 18, 1865, for a brake with laterally-adjustable friction-clamps with convex and concave faces, in combination with intermediate friction-plates; but I am not aware, and do not believe, that the mechanisms and employment of the same or the application of the principles herein described are covered by said patent.

What I claim, and desire to secure by Letters Patent, is—

1. A brake for railway and other vehicles, consisting of a wheel or disk with flat parallel vertical faces rigidly secured to the axle between or upon the wheels, a clamp or shoe suspended at either side of said disk and rigidly fixed against any rotation with the axle or disk for engaging said wheel or disk in frictional contact, all the parts being so arranged in combination as to permit the axle and disk to move freely both laterally and vertically, and suitable mechanism for operating said clamp or shoes, as set forth.

2. A wheel or disk with flat parallel vertical faces secured to the axle between or upon the wheels and duplicate cheek-pieces with flat vertical faces made of wood or other suitable material, for clamping said wheel or disk, to be placed in suitable sockets in side plates, H H, in combination with suitable mechanism for producing said clamping action, for the purpose specified.

3. The wheel or disk C, having the circumferential groove D, in combination with the vibrating arm E, the swinging side plates, H H, carrying the clamps or shoes F F, the yielding arms or springs T T, the connecting eye-rods S S, the double crank N'', and intermediate vibrating wrist-pins, M, and pivoted arms L L, substantially as described.

4. The side plates, H, provided with the yielding arm or springs T, connecting eye-rod S, double crank N'', and spring T, substantially as described.

5. The semi-annular plate H''', in combination with side plates, H H, substantially as described.

6. The hinge-pin L', in combination with the vibrating fulcrum-bracket E' and ear-bracket K, substantially as described.

OROSCO C. WOOLSON.

Witnesses:
 THOS. D. MASON,
 EDMUND D. HENNESSY.